(12) United States Patent
Ren et al.

(10) Patent No.: US 10,718,706 B2
(45) Date of Patent: Jul. 21, 2020

(54) LASER DISPERSION SPECTROSCOPY FOR NON-INTRUSIVE COMBUSTION DIAGNOSTICS

(71) Applicant: The Chinese University of Hong Kong, Hong Kong (CN)

(72) Inventors: Wei Ren, Hong Kong (CN); Liuhao Ma, Hong Kong (CN); Zhen Wang, Hong Kong (CN); Kin Pang Cheong, Hong Kong (CN)

(73) Assignee: The Chinese University of Hong Kong, Hong Kong (CN)

( * ) Notice: Subject to any disclaimer, the term of this patent is extended or adjusted under 35 U.S.C. 154(b) by 225 days.

(21) Appl. No.: 15/971,757

(22) Filed: May 4, 2018

(65) Prior Publication Data

US 2019/0339194 A1 Nov. 7, 2019

(51) Int. Cl.
   *G01K 11/12* (2006.01)
   *G01N 21/25* (2006.01)
   *G01N 21/3504* (2014.01)

(52) U.S. Cl.
   CPC .......... *G01N 21/255* (2013.01); *G01K 11/12* (2013.01); *G01N 21/3504* (2013.01); *G01N 2201/06113* (2013.01); *G01N 2201/1293* (2013.01)

(58) Field of Classification Search
   CPC .......... G01N 21/3504; G01N 21/1702; G01N 2201/1293
   See application file for complete search history.

(56) References Cited

U.S. PATENT DOCUMENTS

| 9,025,163 | B2 | 5/2015 | Wysocki et al. |
| 9,068,940 | B2 | 6/2015 | Nikodem et al. |
| 2006/0255278 | A1* | 11/2006 | Frodl .................. G01N 21/274 250/343 |
| 2013/0229658 | A1* | 9/2013 | Jouanique-Dubuis ..................... G01J 3/0289 356/437 |
| 2016/0134797 | A1* | 5/2016 | Perez-Feliciano ... H04N 5/2258 348/262 |

(Continued)

FOREIGN PATENT DOCUMENTS

WO   WO-2017/214155 A1   12/2017

OTHER PUBLICATIONS

Pedro Martín Mateos, "New Spectroscopic Techniques and Architectures for Environmental and Biomedical Applications", 2015 (Year: 2015).*

(Continued)

*Primary Examiner* — Maurice C Smith
(74) *Attorney, Agent, or Firm* — Saliwanchik, Lloyd & Eisenschenk (57) ABSTRACT

Systems and methods of laser dispersion spectroscopy for in situ, quantitative and non-intrusive measurements of combustion parameters, such as temperature and gas concentrations are provided. The system includes a laser source configured to sweep across the spectral features of molecules, an RF generator configured to modulate a laser to generate a three-tone laser beam, a photodetector configured to detect the transmitted three-tone laser beam to generate a heterodyne beat note signal, and a lock-in amplifier configured to further process the beat note signal in order to measure a phase of the heterodyne beat note signal.

17 Claims, 10 Drawing Sheets

(56) References Cited

U.S. PATENT DOCUMENTS

2018/0306713 A1* 10/2018 Rao ........................... G01J 3/10

OTHER PUBLICATIONS

Toll, J. S., Causality and the Dispersion Relation: Logical Foundations, Physical Review, Dec. 15, 1956, 104(6):1760-1770.

Wysocki, G. et al., Molecular dispersion spectroscopy for chemical sensing using chirped mid-infrared quantum cascade laser, OPTICS EXPRESS, Dec. 6, 2010, 18(25):26123-26140, 2010 Optical Society of America.

Martín-Mateos, P. et al., Heterodyne phase-sensitive detection for calibration-free molecular dispersion spectroscopy, OPTICS EXPRESS, Jun. 16, 2014, 22(12):15143-15153, 2014 Optical Society of America.

Ding, W. et al., Dual-sideband heterodyne of dispersion spectroscopy based on phase-sensitive detection, *Applied Optics*, Nov. 1, 2016, 55(31):8698-8704, 2016 Optical Society of America.

Martín-Mateos, P. et al., Heterodyne Phase-Sensitive Dispersion Spectroscopy in the Mid-Infrared with a Quantum Cascade Laser, Analytical Chemistry, 2017, 89:5916-5922, 2017 American Chemical Society.

Paul, S. et al., Multispecies Heterodyne Phase Sensitive Dispersion Spectroscopy over 80 nm Using a MEMS-VCSEL, ACS Photonics, 2017, 4:2664-2668, 2017 American Chemical Society.

Olesen, H. et al., A Theoretical and Experimental Analysis of Modulated Laser Fields and Power Spectra, IEEE Journal of Quantum Electronics, Dec. 1982, QE-18(12):2069-2080, 1982 IEEE.

Hangauer, A. et al., Chirped laser dispersion spectroscopy using a directly modulated quantum cascade laser, Applied Physics Letters, 2013, 103:191107-1-191107-4, 2013 AIP Publishing LLC.

Hangauer, A. et al., High frequency modulation capabilities and quasi single-sideband emission from a quantum cascade laser, OPTICS EXPRESS, Sep. 22, 2014, 22(19):23439-23455, 2014 Optical Society of America.

Gordon, I. E. et al., The HITRAN2016 molecular spectroscopic database, Journal of Quantitative Spectroscopy & Radiative Transfer, 2017, 203:3-69, Elsevier Ltd.

Rothman, L. S. et al., HITEMP, the high-temperature molecular spectroscopic database, Journal of Quantitative Spectroscopy & Radiative Transfer, 2010, 111:2139-2150, 2010 Elsevier Ltd.

* cited by examiner

LASER DISPERSION SPECTROSCOPY FOR NON-INTRUSIVE COMBUSTION DIAGNOSTICS

FIELD OF THE INVENTION

Embodiments of the subject invention relate generally to the use of laser dispersion spectroscopy for in situ, quantitative, calibration-free, and non-intrusive measurements in environmental/biomedical trace gas monitoring and temperature/gas sensing in combustion systems. More particularly, the methods and systems can be used to measure the dispersion of laser radiation attributable to an interaction of a laser beam with target gas species.

BACKGROUND

In situ and non-intrusive laser-based spectroscopic methods have been widely used for gas sensing and analysis in environmental monitoring and combustion diagnostics. Among various laser diagnostic methods, laser absorption spectroscopy (LAS) and laser dispersion spectroscopy (LDS) are two representative spectroscopic techniques that demonstrate accurate quantitative measurement and high sensitivity. In particular, LDS is a technique for gas sensing by detecting the optical phase signal associated with a refractive index change instead of measuring laser intensity attenuation as performed in a LAS technique. The LDS technique can overcome the baseline fitting and normalization problems found in a LAS technique. The LDS technique also has an intrinsic immunity to laser power fluctuations, has a large dynamic range, and allows for calibration-free operation.

A direct dispersion measurement can be realized using either chirped laser dispersion spectroscopy (CLaDs) or heterodyne phase-sensitive dispersion spectroscopy (HPSDS). CLaDs uses a frequency-chirped laser to transform an optical phase variation into a frequency shift, by which a dispersion spectra can be recovered. In comparison, HPSDS has the advantages of simpler optical configurations and data acquisition processes by intensity modulation of the lasers to generate spectral sidebands. Currently, several HPSDS-based gas sensors have been developed for trace gas sensing. For near-infrared HPSDS sensors, commercial electro-optical modulators (EOMs) and acousto-modulator (AOMs) are mostly used to modulate the laser intensity to generate a multi-color laser beam. Due to the commercial unavailability of EOMs and AOMs in the mid-infrared region, direct intensity-modulation of a laser injection current can be used in order to generate spectral sidebands. An accurate spectroscopic model is required to take into account the entire physical process from a mid-infrared laser emission with high-frequency current modulation, the light-gas interaction resulting in dispersion and absorption, to the final heterodyne phase detection.

Recent advancements in laser technology have provided room-temperature, high-powered laser sources in the mid-infrared region. Stronger absorption bands of combustion gases (i.e., $H_2O$, $CO_2$, CO, NO) are located in the mid-infrared region. As the dispersion associated with the refractive index is related to the frequency-dependent absorption coefficient via the Kramers-Kronig relation, the spectral feature with a stronger absorption is accompanied by a stronger dispersion.

Currently no research is reported on the development and application of LDS for combustion diagnostics. In practical laser-based combustion diagnostic systems, laser power fluctuations and photodetector (PD) drifts introduce inevitable measurement uncertainties. The intrinsic power fluctuation immunity and calibration-free operation characteristics of the methods and system described herein make the dispersion spectroscopy combined with heterodyne detection more suitable for diagnostics under harsh environments. Accordingly, embodiments of the subject invention provide a dispersion spectroscopy technique in the mid-infrared region and other spectral domains.

BRIEF SUMMARY

Embodiments of the subject invention provide methods and systems for using LDS for trace gas sensing in an atmospheric environment and simultaneous measurement of temperature and gas concentrations in a combustion environment. In particular, the subject invention combines the mid-infrared laser dispersion method with heterodyne phase-sensitive detection and exploits the advantages of LDS to achieve power-fluctuation-immune and calibration-free measurements.

The apparatus includes single or multiple tunable laser sources to access the spectral features of target species. A radio frequency (RF) generator is used to modulate the laser to generate a three-tone laser beam. The generated three-tone laser beam can be directed through a combustion field or a gas sample. It should be appreciated by one of ordinary skill in the art that alternate methods that can be used to generate sidebands are within the scope of this invention. The transmitted laser beam can be detected by a square law photodetector and then a beat note signal can be generated. The beat note signal mixed with another RF sinusoidal signal is downshifted to the operating range of a lock-in amplifier. Software and applicable hardware can be configured to acquire the final dispersion spectra and the phase of the beat note signal.

Previous HPSDS sensors used for trace gas sensing have required a calibration process and currently there is no spectroscopic model for calibration-free HPSDS. In addition, no application or research has been reported for gas concentration and temperature measurements in a combustion environment using HPSDS. In particular, the temperature measurement or simultaneous measurement of temperature and gas concentrations using LDS has never been reported. The spectroscopic techniques described herein can be applied to chemical, biological, and environmental trace gas or isotopic element sensing.

BRIEF DESCRIPTION OF THE DRAWINGS

FIG. 8(*a*) is a plot showing measured HPSDS phase signals at different optical power levels for the same $N_2O$ concentration (496 ppm). FIG. 8(*b*) is a plot showing LDS phase signals at varied incident laser powers. Projections of all the phase signals to the vertical plane show a negligible difference of the peak-to-peak amplitudes.

FIG. 11(*a*) is a plot showing a comparison between the measured temperature using LDS and other methods (thermocouple, CHEMKIN® simulation). FIG. 11(*b*) is a plot showing a comparison of the measured $H_2O$ concentrations using LDS and CHEMKIN® simulations.

DETAILED DISCLOSURE OF THE INVENTION

Although the following detailed description contains many specifics for the purposes of illustration, one of ordinary skill in the art will readily appreciate that many variations and alterations to the following exemplary details are within the scope of the invention. Accordingly, the following preferred embodiment of the invention is set forth without any loss of generality to, and without imposing limitations upon, the claimed invention.

Dispersion spectroscopy measures the phase information associated with the refractive index variation of gas medium that is inherent to a molecular transition. When the laser wavelength is tuned close to the molecular transition (i.e., rotational, vibrational and electronic), absorption and dispersion of the incident laser radiation occur simultaneously. The refractive index is related to the frequency-dependent absorption coefficient expressed by the Kramers-Kronig equation:

$$n(\omega) = 1 + \frac{c}{\pi}\int_0^{+\infty}\frac{\alpha(\omega')}{\omega'^2 - \omega^2}d\omega', \quad (1)$$

where $n(\omega)$ and $\alpha(\omega)$ are the refractive index and absorption coefficient at the optical angular frequency ω, respectively; and c is the speed of light in a vacuum. Hence, a dispersion measurement can be performed instead of laser intensity measurement to retrieve the same spectroscopic information as that when using LAS.

Figure 1:
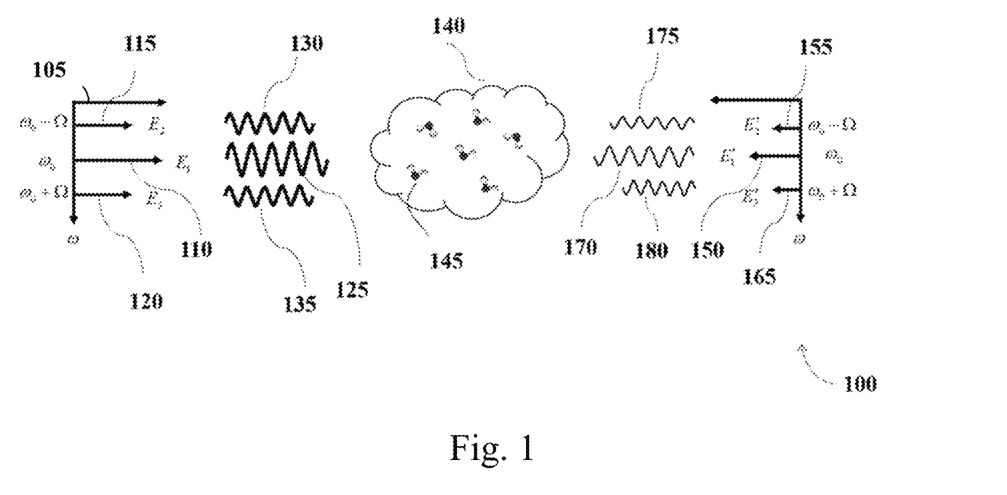
FIG. 1 is a diagram showing a three-tone laser beam traveling through a gas medium or combustion field.

For mid-infrared laser sources such as a quantum cascade laser (QCL) and an interband cascade laser (ICL), a fast modulation of the laser injection current at an angular frequency ω generates a three-tone laser 105. As schematically shown in FIG. 1, the modulated QCL radiation 105 contains one central tone $E_1$ 110 at $\omega_0$ and two sidebands ($E_2$ 115 and $E_3$ 120) at $\omega_0\pm\Omega$, respectively. The waveforms 125, 130, and 135 of the three-tone laser are sinusoidal. Meanwhile, an additional intensity modulation (IM) of the laser source accompanies the frequency modulation (FM). Hence, the three-tone radiation can be expressed as:

$$E_1 = I\cos(\omega_0 t), \quad (2)$$

$$E_2 = \frac{a}{4}I\left\{\cos[(\omega_0 + \Omega)t] + \frac{2b}{a}\cos[(\omega_0 + \Omega)t - \phi]\right\}, \quad (3)$$

$$E_3 = \frac{a}{4}I\left\{\cos[(\omega_0 - \Omega)t] - \frac{2b}{a}\cos[(\omega_0 - \Omega)t + \phi]\right\}, \quad (4)$$

where I is the laser intensity, a is the IM index (amplitude of IM divided by the total intensity), b is the FM index (amplitude of FM divided by the modulation frequency), and ϕ is the phase shift between FM and IM.

After travelling through the high temperature gas medium 140 with a path length of L, the three tones of the laser beam interact with the target molecule (i.e., $H_2O$ 145) and each experience different respective phase shifts induced by dispersion and intensity attenuation due to gas absorption near the target absorption line. The transmitted three-tone laser radiation ($E_1'$ 150, $E_2'$ 155, and $E_3'$ 165) can be expressed as:

$$E_1' = e^{-\frac{\alpha(\omega_0)L}{2}}I\cos(\omega_0 t - \psi_1), \quad (5)$$

$$E_2' = e^{-\frac{\alpha(\omega_0+\Omega)L}{2}}\frac{a}{4}I\left\{\cos[(\omega_0+\Omega)t - \psi_2] + \frac{2b}{a}\cos[(\omega_0+\Omega)t - \phi - \psi_2]\right\}, \quad (6)$$

$$E_3' = e^{-\frac{\alpha(\omega_0-\Omega)L}{2}}\frac{a}{4}I\left\{\cos[(\omega_0-\Omega)t - \psi_3] - \frac{2b}{a}\cos[(\omega_0-\Omega)t + \phi - \psi_3]\right\}, \quad (7)$$

where $\psi_1$, $\psi_2$ and $\psi_3$ are the respective phase shifts of each of the three tones induced by dispersion and $\alpha(\omega_0)$, $\alpha(\omega_0+\Omega)$ and $\alpha(\omega_0-\Omega)$ are the respective absorption coefficients. The waveforms 170, 175, and 180 of the three-tone radiation are sinusoidal. The transmitted laser beam impinges on a square-law photodetector and generates a radio frequency (RF) beat note signal that can be expressed as:

$$I = (E_1' + E_2' + E_3')^2 \quad (8)$$

Hence, the dispersion information is encoded in the phase of the beat note component that has the same frequency (Ω) as the laser modulation frequency. The detected beat note signal can then be downshifted by a mixer to the frequency-range of the lock-in amplifier to obtain the dispersion information. Once the dispersion spectra of the two absorption lines with different lower state energies are measured, temperatures can be retrieved using a standard two-line thermometry method.

The detected phase of the beat note signal, Ψ, is only a function of laser modulation parameters such as the refractive index and absorption coefficients at the three tones:

$$\Psi = f\{n(\omega), n(\omega\pm\Omega), \alpha(\omega), \alpha(\omega\pm\Omega), a, b, \phi\}. \quad (9)$$

The gas properties (gas concentration and temperature) are encoded in the phase information of the beat note. The phase information is irrelevant to laser intensity I and thus dispersion detection is immune to laser power fluctuations. Once the laser modulation parameters a, b, and ϕ are experimentally measured, it is possible to perform calibration-free dispersion measurements using spectroscopic parameters provided in spectroscopic databases such as HITRAN 2012 and HITEMP 2010.

Figure 2:
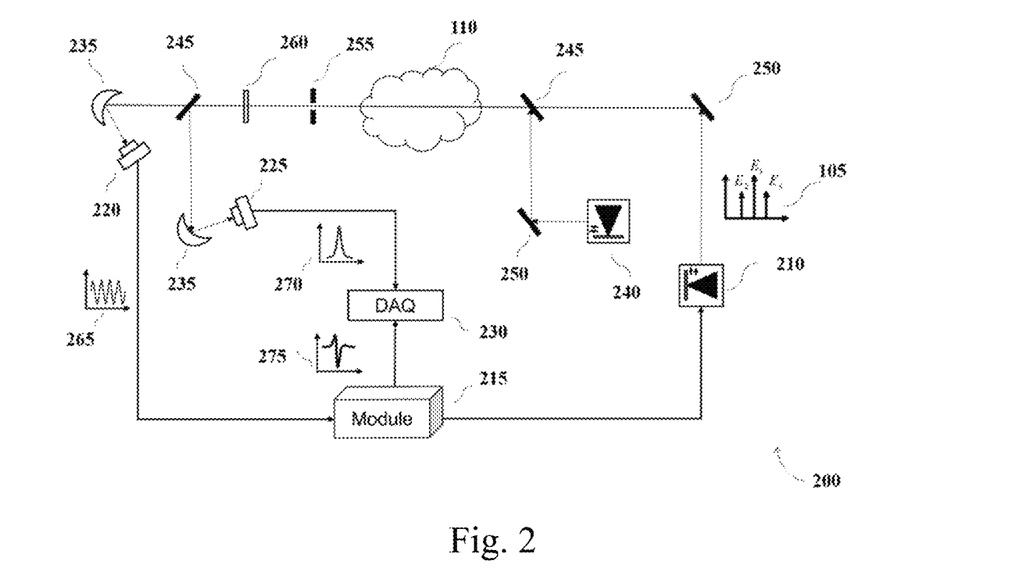
FIG. 2 is a diagram of an apparatus configured for direct laser dispersion signal measurement.

FIG. 2 is a diagram of an apparatus 200 configured for gas sensing using mid-infrared dispersion spectroscopy. The apparatus 200 includes a mid-infrared laser source 210 configured to exploit a spectral feature of the target species, a module 215 configured for laser modulation and beat note detection, two photodetectors (220, 225) configured to detect the transmitted laser beam (one photodetector 220 for dispersion measurement and the other photodetector 225 for absorption measurement), a DAQ 230 configured to record the measured signal, two concave mirrors 235 configured to collect the transmitted laser beam and mitigate the beam steering effect, a visible laser 240 configured to assist the optical alignment, flip mirrors 245 and plane mirrors 250 configured to direct the laser beam through the gas medium 110, an iris 255 configured to adjust the incident laser power and mitigate the unwanted thermal radiation, a narrow bandpass filter (NBF) 260 configured to suppress the thermal background emission.

Figure 3:
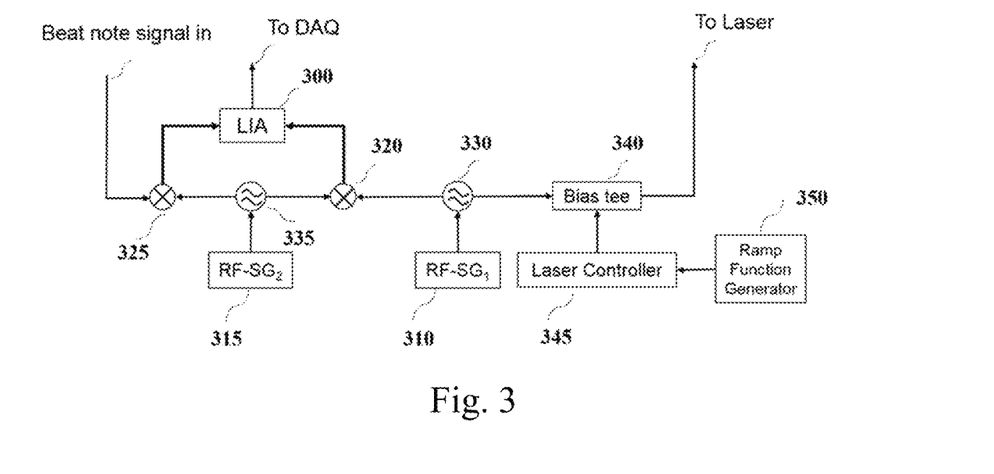
FIG. 3 is a diagram of a module configured for laser modulation and beat note detection.

FIG. 3 is a diagram of the module 215 configured for laser modulation and beat note detection. The module 215 comprises a lock-in amplifier (LIA) 300, two RF generators (310, 315), two mixers (320, 325), two splitters (330, 335), a bias tee 340, a laser controller 345, and a ramp function generator 350. The temperature and injection current of the laser are controlled by the low-noise laser drivers 345. An RF generator 310 can be configured to sinusoidally modulate the laser injection current. The modulation frequency Q can be in a range from 100 MHz to 10 GHz to find the optimal value directed to the highest signal. A ramp function generator 350 can be configured to generate a slow ramp signal to sweep across the spectral features. The sinusoidal modulation signal and ramp signal can be combined in a bias tee 340 and then directly injected to the laser 210. The ramp signal can be transmitted at a frequency of 5 kHz or less. At such a high modulation, the laser source (i.e. QCL and ICL) can emit a three-tone beam 105. A three-tone beam can also be generated using an acousto-optical modulator. The generated three-tone beam 105 can be directly transmitted through the combustion environment by a plane mirror 250 and collected by a concave mirror 235 onto a photodetector 220. The photodetector 220 can be a high-speed photodetector with a high bandwidth (i.e. more than 1 GHz). The detected beat note signal 265 can be mixed with another RF sinusoidal signal generated by the RF generator 315. Then, the detected beat note signal 265 can be downshifted to the frequency range of the lock-in amplifier 300. The reference signal can be injected into the lock-in amplifier 300 and taken from the difference of the two RF generators (310, 315). In one embodiment, the RF generator 310 can emit a modulation signal at a frequency greater than or equal to 950 KHz. An LAS setup is also included in FIG. 2 to for a comparison with the dispersion measurement, which is not required if only the LDS measurement is performed. A flip mirror 245 can be located downstream to direct the transmitted laser beam to another photodetector 250. The photodetector 225 can be a photodetector with a bandwidth greater than or equal to 1 MHz for LAS measurement. The dispersion phase signal 270 and direct absorption signal 275 can be recorded by a data acquisition (DAQ) card 230. The photodetector 225 can further be covered with a copper mesh for electromagnetic shielding.

Figure 4:
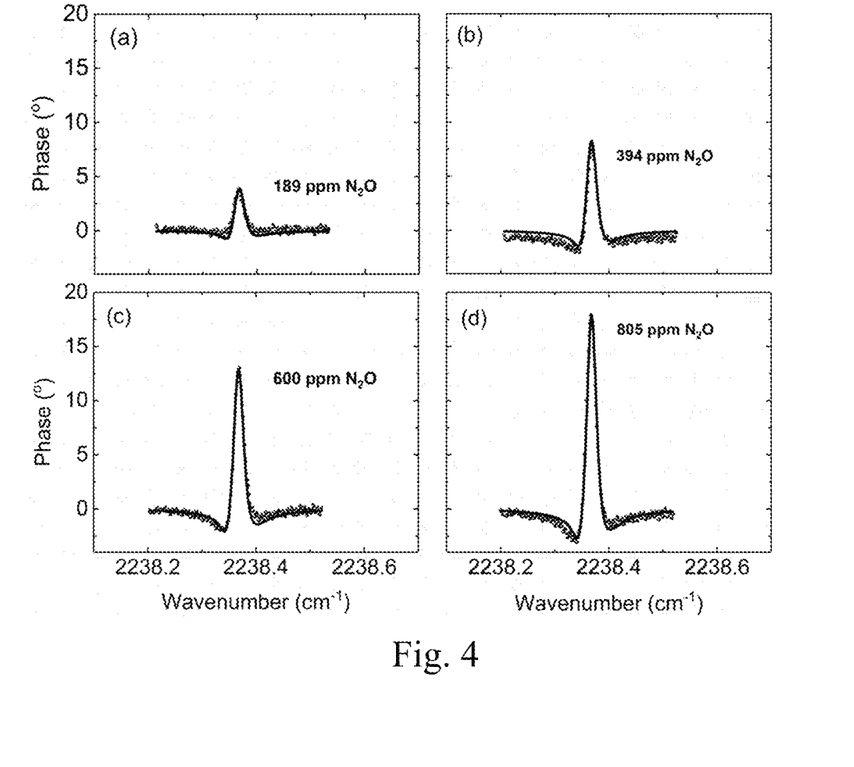
FIG. 4 shows plots of the measured and calculated dispersion spectra of $N_2O$ with varied concentrations (189 ppm, 394 ppm, 600 ppm, and 805 ppm).

The ramp function generator 350 can be configured to scan the laser from a low frequency such as 0.01 Hz to a high frequency such as 5 kHz. The RF generator 310 can be configured to modulate the laser over a frequency range of 100 MHz-10 GHz. Referring to FIG. 4, an embodiment of the subject invention can be used for $N_2O$ detection in a low-pressure gas cell. The gas cell can have a length of 10 cm and can be filled with $N_2O/N_2$ mixtures at a fixed pressure of 200 Torr.

FIG. 4 presents the measured and calculated dispersion spectra of $N_2O$ with various concentrations (189 ppm, 394 ppm, 600 ppm and 805 ppm). The calculated LDS spectra using the analytical model for the corresponding $N_2O$ concentrations correlate with the measurements and have a relative standard deviation of less than 3%. Considering the standard deviation of the detection noise (1σ) is ~0.37°, a signal-to-noise ratio (SNR) of 12 can be obtained for the $N_2O$ concentration of 189 ppm, corresponding to a minimum detectable $N_2O$ concentration of 16 ppm. The same noise level can be observed by monitoring the phase signals with the laser being turned on and off, respectively.

Figure 5:
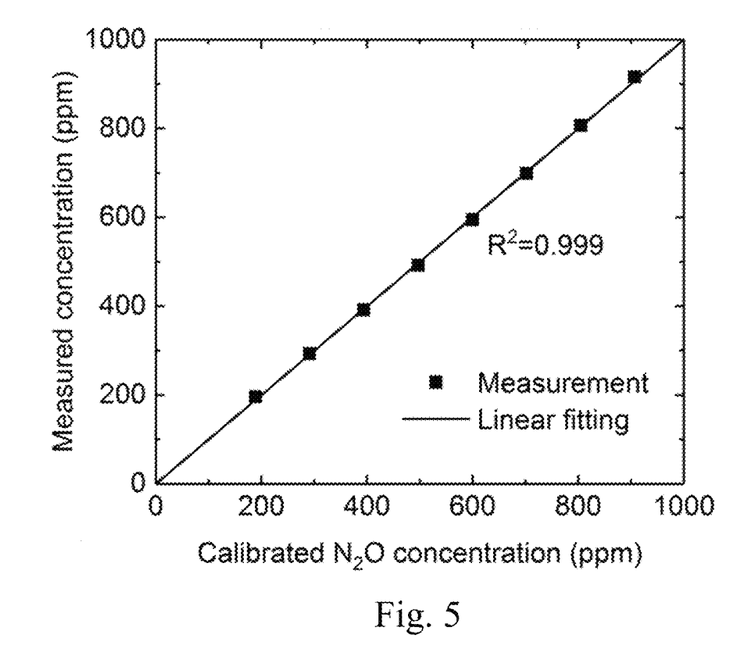
FIG. 5 is a plot showing a comparison between the measured $N_2O$ concentration using LDS and the calibrated concentrations generated by a gas dilution system.

Referring to FIG. 5, the representative peak-to-peak amplitude of the measured dispersion spectra acquired using the mid-infrared LDS is depicted as a function of the $N_2O$ concentration (189-907 ppm). A linear fit to the experimental data yields an R-square value of 0.999, indicating an excellent linear response of the sensor to the $N_2O$ concentration.

Figure 6:
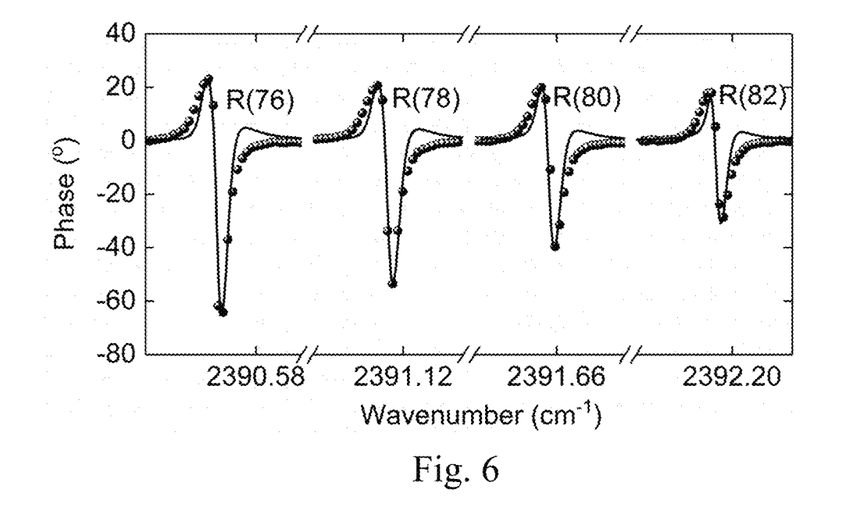
FIG. 6 is a plot showing representative LDS phase signals of lines R(76), R(78), R(80) and R(82) of $CO_2$ at the stoichiometric condition of the $CH_4$/air flame.

Referring to FIG. 6, an embodiment of the subject invention was used for $CO_2$ measurement in a laminar premixed flame at the atmospheric condition. The measurements were performed using an ICL which covers several $CO_2$ transitions (2390.52 cm$^{-1}$, 2391.10 cm$^{-1}$, 2391.65 cm$^{-1}$ and 2392.18 cm$^{-1}$ in the $v_3$ fundamental band). FIG. 6 depicts the LDS spectra of the selected $CO_2$ transitions (R(76), R(78), R(80) and R(82)) at the stoichiometric condition of the $CH_4$/air flame. The difference of the peak-to-peak amplitudes among these four lines reflects the different linestrengths. The dispersion measurement was performed at the optimal modulation frequency of 300 MHz in the flame measurements. The narrow band-pass filter used for $CO_2$ measurement has a bandwidth of 80 nm.

Figure 7:
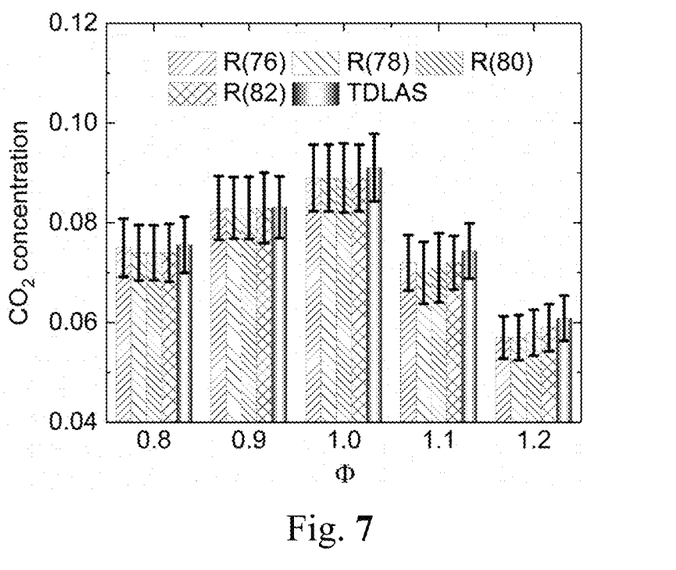
FIG. 7 is a plot showing the measured $CO_2$ concentrations at the equivalence ratio Φ=0.8-1.2 using the R(76), R(78), R(80), and R(82) transitions.
Figure 8A:
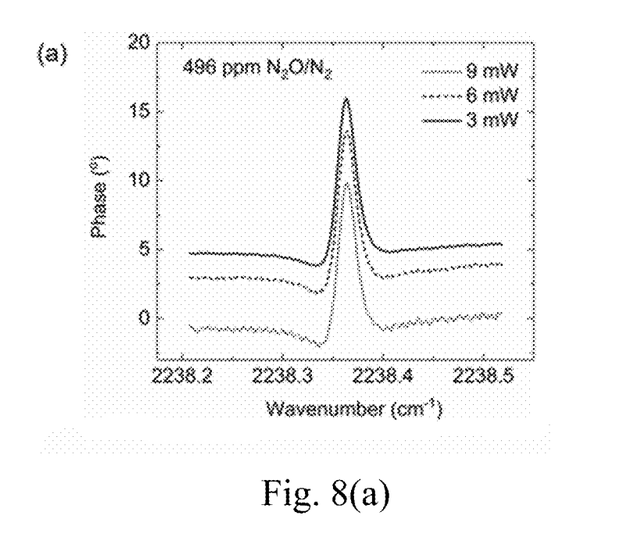
Figure 8B:
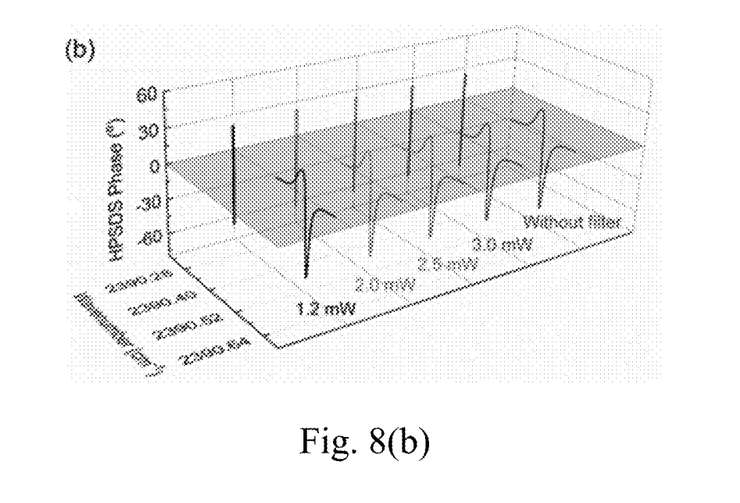

Referring to FIG. 7, the dispersion-determined $CO_2$ concentrations (equivalence ratio, Φ=0.8-1.2) using the four $CO_2$ lines were compared with the TDLAS measurements using the R(76) line. In general, a good correlation was seen among the measurements and the maximum relative difference was 3.5% at Φ=1.2. The dispersion measurement was considered to have the same uncertainty as LAS. Similar to the uncertainty estimation of LAS, the uncertainty factors are treated independent and combined by the standard error propagation in dispersion measurements. The current LDS measurement has an overall uncertainty of 7.5%, including the peak-to-peak fitting error of 0.8%, the line-strength uncertainty of 5%, and the temperature uncertainty of 5.5%. Referring to FIG. 8, the dispersion spectra were measured at different incident laser powers. FIG. 8(a) depicts the measured LDS phase signals for the same $N_2O$ mixture (496 ppm) in a room-temperature gas cell at three different optical powers (3 mW, 6 mW, and 9 mW). FIG. 8(b) shows the LDS phase signals of $CO_2$ in flames with the laser power lowered from 3.3 mW to 1.2 mW, and the optical filter removed from the optical setup. The waveforms and the peak-to-peak amplitudes of the dispersion spectra were observed to remain unchanged even though the laser intensity fluctuated.

Figure 9:
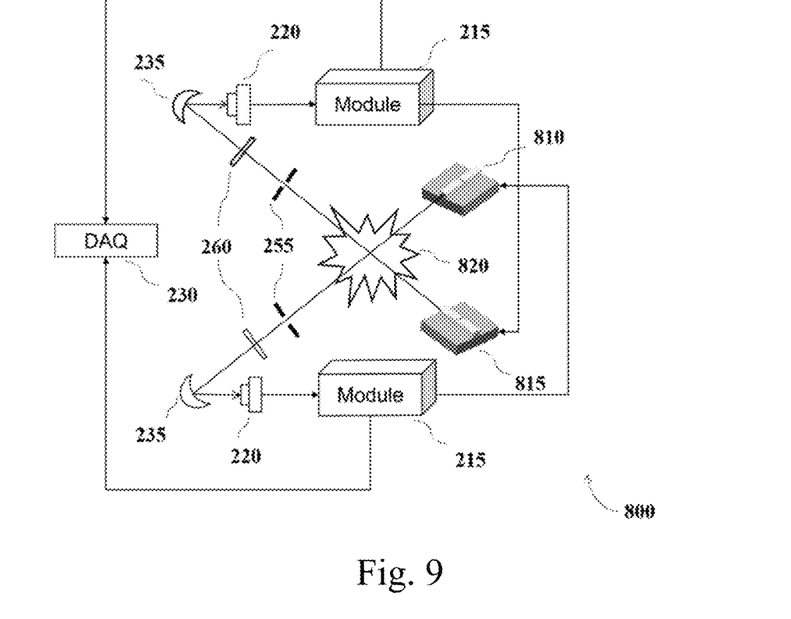
FIG. 9 is a diagram of an apparatus configured for simultaneous temperature and $H_2O$ concentration measurements.
Figure 10:
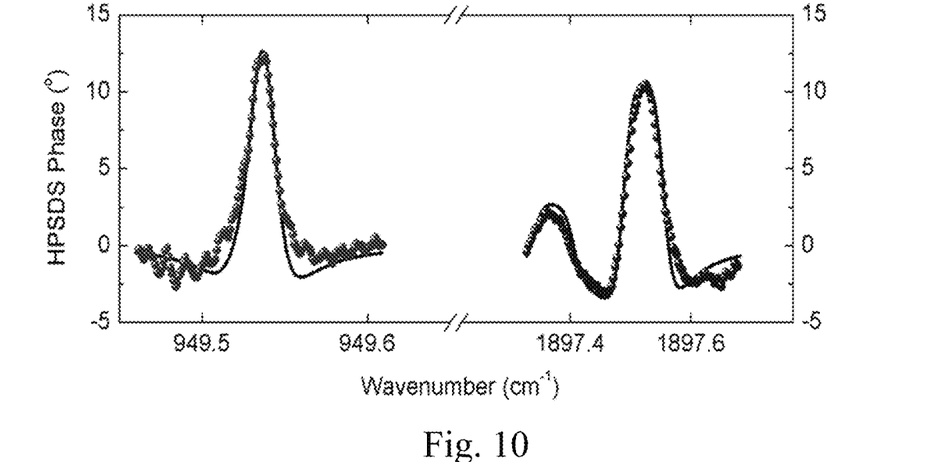
FIG. 10 is a plot showing the measured and calculated dispersion spectra of $H_2O$ at 1897.52 $cm^{-1}$ and 949.53 $cm^{-1}$.

Referring to FIG. 9, another embodiment of the subject invention was used for simultaneous measurement of temperature and $H_2O$ concentration in the flame 820. Two QCLs (810 for the 10.5 μm, 815 for the 5.27 μm) were tuned to the two target $H_2O$ lines at 949.53 cm$^{-1}$ and 1897.52 cm$^{-1}$, respectively. The two lasers were intensity-modulated at the optimal modulation frequencies of 400 MHz and 1 GHz, respectively, in order to obtain the strongest signals. The measured and calculated dispersion spectra of the two $H_2O$ transitions (949.53 cm$^{-1}$ and 1897.52 cm$^{-1}$) at the stoichiometric condition of the $CH_4$/air flame are shown FIG. 10.

Figure 11A:
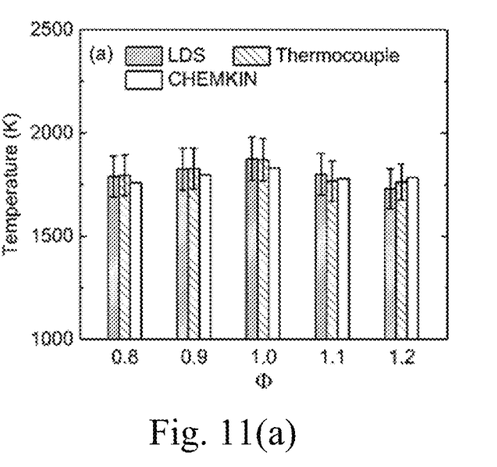
Figure 11B:
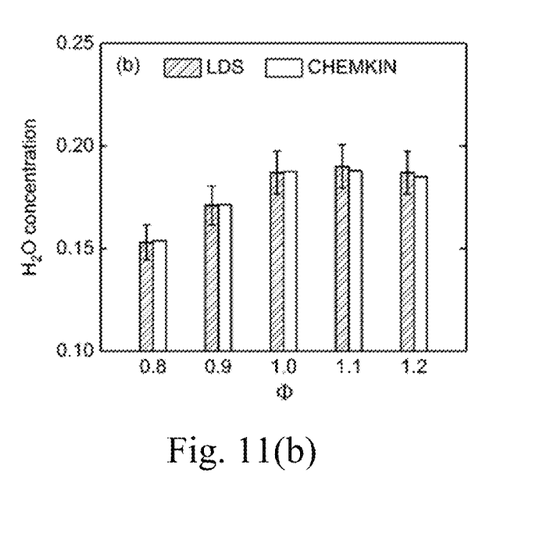

Referring to FIG. 11, the LDS-determined temperatures were compared with the thermocouple measurements and CHEMKIN® calculations. In general, the LDS measurements correlated with the thermocouple results within 2% (mostly within 1.5% except for the case at Φ=1.1), and were 3% different from the CHEMKIN® calculations. The overall uncertainty of the LDS thermometry is estimated to be ~5.6% considering the spectral peak-to-peak fitting error of 1% and the line-strength uncertainty of 5%. In addition, the measured $H_2O$ mole fractions at different equivalence ratios were compared with the CHEMKIN simulations. The measured $H_2O$ mole fractions correlated with the CHEMKIN® calculations, mostly within a relative difference of 0.5%.

Figure 12:
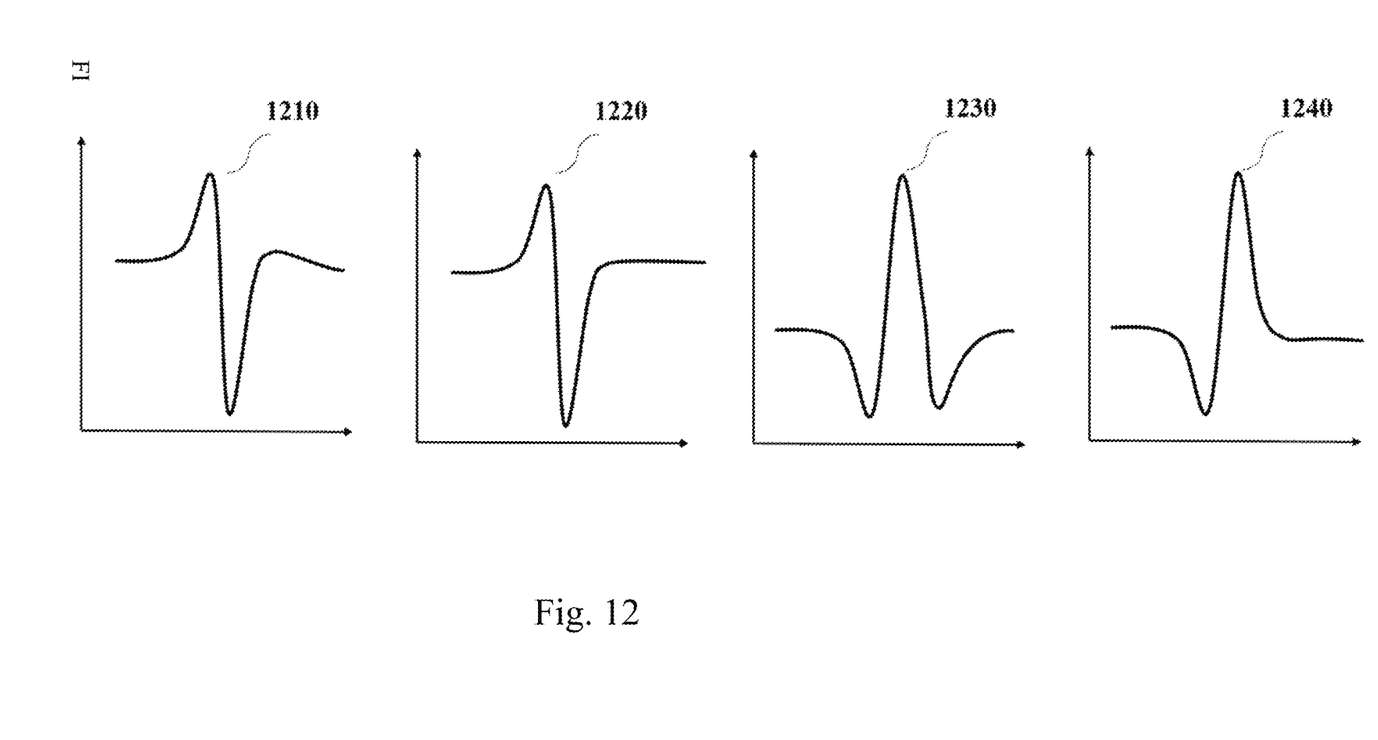
FIG. 12 shows diagrams of possible dispersion signals.

The possible waveforms (1210, 1220, 1230, and 1240) of the measured dispersion spectra in the combustion environment are shown in FIG. 12. A preferred absolute peak-to-peak amplitude in the dispersion spectra is 0-180°.

Figure 13:
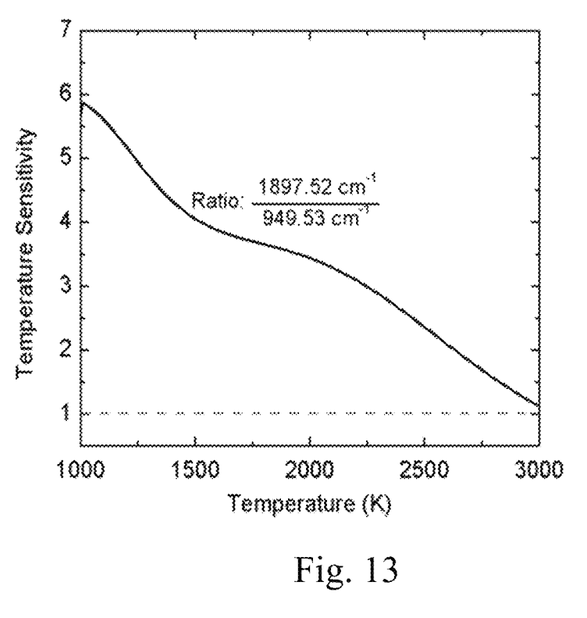
FIG. 13 is a plot showing the temperature sensitivity for LDS using the 1897.52/949.53 $cm^{-1}$ line pair of $H_2O$.

To perform dispersion-based two-line thermometry, the wavelength selection criteria can be as follows: (1) the transitions of the target species should be well isolated from those of other typical combustion products, (2) strong absorption line-strength is required to ensure a high signal-to-noise ratio (SNR), (3) the absorption line with a relatively large lower state energy (E">900 $cm^{-1}$) is preferred to eliminate the interference in the ambient atmosphere, and (4) the difference of the (E") values of the selected two transitions should be large enough to ensure a sufficient temperature sensitivity. The temperature sensitivity is defined as the measurement sensitivity as the derivative of the peak-to-peak ratio (R) with respect to temperature, or |(dR/R)/(dT/T)|, which indicates the unit change in the normalized ratio of peak-to-peak amplitude for a unit change in the normalized temperature. FIG. 13 plots the temperature sensitivity of the selected $H_2O$ line pair (1897.52 $cm^{-1}$/949.53 $cm^{-1}$) over a temperature range of 1000-3000 K. The temperature sensitivity of the dispersion-based two-line thermometry is greater than 1 up to 3000 K.

The apparatuses and methods described herein can be used for measuring different gas species simultaneously with a widely tunable laser source. More specifically, the laser source can be a QCL, an ICL, an optical parametric oscillator (OPO), a vertical cavity surface emitting laser (VCSEL), a solid-state and fiber laser, a super-continuum laser, and a difference frequency generation system.

Figure 14:
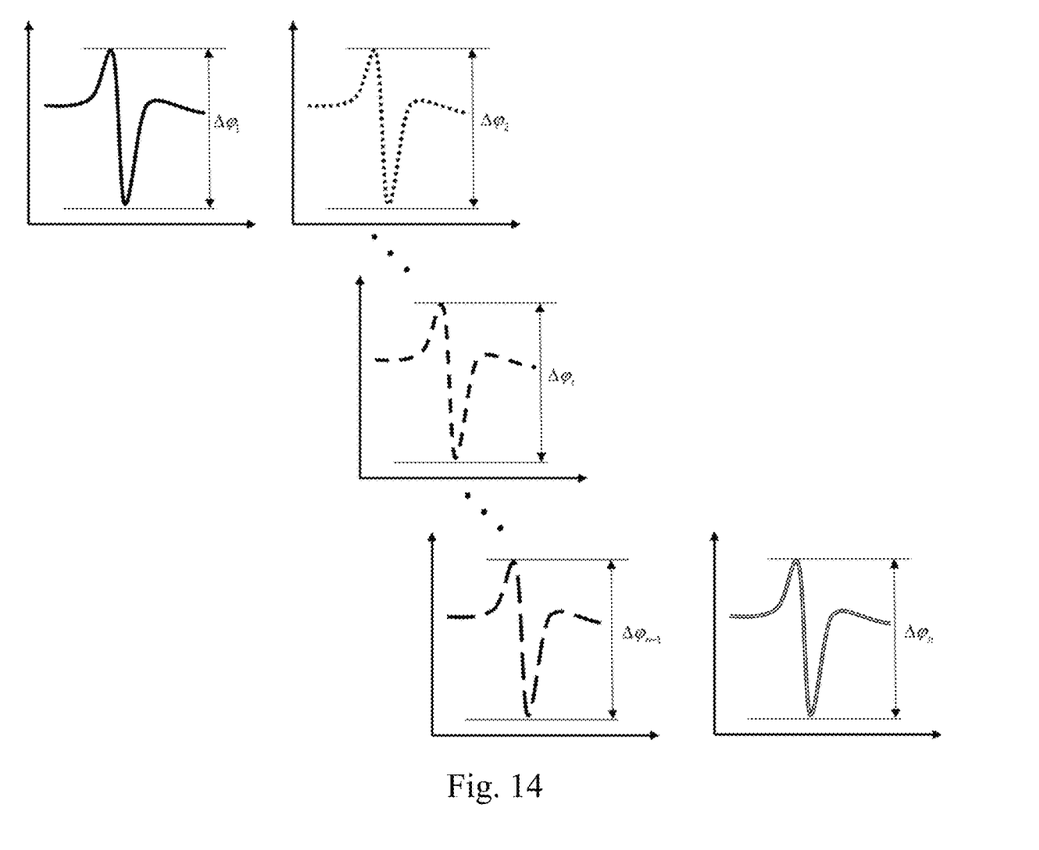
FIG. 14 shows plots of a series of dispersion signals used for non-uniform combustion diagnostics.

Characterization of a non-uniform combustion field can be realized using multi-line dispersion spectroscopy. The non-uniform temperatures and gas concentrations can be obtained by measuring a series of dispersion spectra, as shown in FIG. 14. By solving equation 10 or 11 using nonlinear least squares fitting, the temperature and gas concentration along the optical path can be obtained. Additionally, profile-fitting and temperature-binning strategies can also be utilized.

$$\min_{T(x),X(x)} \sum_{i=1}^{n} (\Delta\varphi_{simulated} - \Delta\varphi_{measurement})^2 \quad (10)$$

$$\min_{T(x),X(x)} \sum_{i=1}^{n} \left(\frac{\Delta\varphi_{simulated} - \Delta\varphi_{measurement}}{\Delta\varphi_{measurement}}\right)^2 \quad (11)$$

Tomography reconstruction methods can be also adopted when using the dispersion spectroscopy for two-dimensional or three-dimensional combustion diagnostics. A multipass cell or cavity-enhanced method can also be used when detecting the radicals and trace gases in the combustion environment using dispersion spectroscopy.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processer reads and executes the code and/or data stored on a computer-readable medium, the computer system and/or processer performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that is capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

It should be understood that the examples and embodiments described herein are for illustrative purposes only and that various modifications or changes in light thereof will be suggested to persons skilled in the art and are to be included within the spirit and purview of this application. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

REFERENCES

[1] J. S. Toll, *Phys. Review* 104 1760 (1956).
[2] G. Wysocki, D. Weidmann, *Opt. Express* 18 26123-26140 (2010).
[3] P. Martin-Mateos, P. Acedo, *Opt. Express* 22 15143-15153 (2014).
[4] W. Ding, L. Sun, L. Yi, X. Ming, *Applied Optics* 55 8698-8704 (2016).
[5] P. Martin-Mateos, J. Hayden, P. Acedo, B. Lendl, *Analyt. Chemistry* 89 5916-5922 (2017).
[6] S. Paul, P. Martin-Mateos, N. Heermeier, F. Küppers, P. Acedo, *ACS Photonics* 4 2664-2668 (2017).
[7] H. Olesen, G. Jacobsen. IEEE. *J. Quantum. Electron.* 18 2069-2080 (1982).
[8] A. Hangauer, G. Spinner, M. Nikodem, and G. Wysocki, *Appl. Phys. Lett.* 103, 191107 (2013).

[9] A. Hangauer, G. Spinner, M. Nikodem, and G. Wysocki, *Optics Express*. 22, 23439-23455 (2014).

[10] I. E. Gordon, L. S. Rothman, C. Hill, R. V. Kochanov, Y. Tan, P. F. Bernath, M. Birk, V. Boudon, A. Campargue, K. V. Chance, B. J. Drouin, J.-M. Flaud, R. R. Gamache, J. T. Hodges, D. Jacquemart, V. I. Perevalov, A. Perrin, K. P. Shine, M.-A. H. Smith, J. Tennyson, G. C. Toon, H. Tran, V. G. Tyuterev, A. Barbe, A. G. Császár, V. M. Devi, T. Furtenbacher, J. J. Harrison, J.-M. Hartmann, A. Jolly, T. J. Johnson, T. Karman, I. Kleiner, A. A. Kyuberis, J. Loos, O. M. Lyulin, S. T. Massie, S. N. Mikhailenko, N. Moazzen-Ahmadi, H. S. P. Müller, O. V. Naumenko, A. V. Nikitin, O. L. Polyansky, M. Rey, M. Rotger, S. W. Sharpe, K. Sung, E. Starikova, S. A. Tashkun, J. Vander Auwera, G. Wagner, J. Wilzewski, P. Wcislo, S. Yu, E. J. Zak, *J. Quant. Spectrosc. Radiat. Transf.* 203 (2017) 3-69.

[11] L. S. Rothman, I. E. Gordon, R. J. Barber, H. Dothe, R. R. Gamache, A. Goldman, V. I. Perevalov,

[12] S. A. Tashkun, and J. Tennyson, *J. Quant. Spectrosc. Radiat. Transf.* 111, 2139-2150 (2010).

What is claimed is:

1. A system for measuring temperature and gas concentrations in a combustion environment, comprising:
   a laser source configured to transmit a laser beam to target single or multiple transitions of gas species;
   a laser driver connected to the laser source and configured to control a temperature and an injection current of the laser source;
   an RF generator configured to generate a first sinusoidal modulation signal that modulates the laser beam transmitted from the laser source to produce a three-tone laser beam;
   a ramp function generator configured to generate a ramp signal;
   a bias-tee connected to the RF generator and configured to direct the first sinusoidal modulation signal and the ramp signal to the laser source;
   a detector configured to detect a three-tone laser beam that has been transmitted through a combustion environment; and
   a non-transitory computer readable medium comprising stored instructions that when executed cause at least one processor to receive a signal from the detector and process the signal for recovery of dispersion spectra,
   wherein the ramp signal has a frequency less than or equal to 5 kHz.

2. The system of claim 1, wherein the detector is a photodetector configured to generate a beat note signal when the three-tone laser beam strikes the photodetector.

3. The system of claim 2, further comprising a lock-in amplifier configured to obtain a phase of the beat note signal.

4. The system of claim 1, wherein a bandwidth of the detector is greater than or equal to 100 MHz.

5. The system of claim 1, further comprising a filter disposed in front of the detector and configured to suppress thermal background emission generated by the combustion environment.

6. The system of claim 5, wherein the filter is a narrow band-pass filter with a bandwidth of less than or equal to 100 nm.

7. The system of claim 1, further comprising a visible laser configured to assist an optical alignment of the three-tone laser beam.

8. The system of claim 1, wherein the detector can detect trace gases in an ambient condition.

9. A system for measuring temperature and gas concentrations in a combustion environment, comprising:
   a laser source configured to transmit a laser beam to target single or multiple transitions of gas species;
   a laser driver connected to the laser source and configured to control a temperature and an injection current of the laser source;
   an RF generator configured to generate a first sinusoidal modulation signal that modulates the laser beam transmitted from the laser source to produce a three-tone laser beam;
   a ramp function generator configured to generate a ramp signal;
   a bias-tee connected to the RF generator and configured to direct the first sinusoidal modulation signal and the ramp signal to the laser source;
   a detector configured to detect a three-tone laser beam that has been transmitted through a combustion environment; and
   a non-transitory computer readable medium comprising stored instructions that when executed cause at least one processor to receive a signal from the detector and process the signal for recovery of dispersion spectra,
   wherein the RF generator is configured to emit the first sinusoidal modulation signal at a frequency greater than or equal to 950 kHz.

10. A system for measuring temperature and gas concentrations in a combustion environment, comprising:
    a laser source configured to transmit a laser beam to target single or multiple transitions of gas species;
    a laser driver connected to the laser source and configured to control a temperature and an injection current of the laser source;
    an RF generator configured to generate a first sinusoidal modulation signal that modulates the laser beam transmitted from the laser source to produce a three-tone laser beam;
    a ramp function generator configured to generate a ramp signal;
    a bias-tee connected to the RF generator and configured to direct the first sinusoidal modulation signal and the ramp signal to the laser source;
    a detector configured to detect a three-tone laser beam that has been transmitted through a combustion environment; and
    a non-transitory computer readable medium comprising stored instructions that when executed cause at least one processor to receive a signal from the detector and process the signal for recovery of dispersion spectra,
    wherein a bandwidth of the detector is greater than or equal to 100 MHz, and
    wherein the detector is covered with a copper mesh for electromagnetic shielding.

11. A system for measuring temperature and gas concentrations in a combustion environment, comprising:
    a laser source configured to transmit a laser beam to target single or multiple transitions of gas species;
    a laser driver connected to the laser source and configured to control a temperature and an injection current of the laser source;
    an RF generator configured to generate a first sinusoidal modulation signal that modulates the laser beam transmitted from the laser source to produce a three-tone laser beam;
    a ramp function generator configured to generate a ramp signal;
    a bias-tee connected to the RF generator and configured to direct the first sinusoidal modulation signal and the ramp signal to the laser source;

a detector configured to detect a three-tone laser beam that has been transmitted through a combustion environment; and a non-transitory computer readable medium comprising stored instructions that when executed cause at least one processor to receive a signal from the detector and process the signal for recovery of dispersion spectra, wherein the detector is a photodetector configured to generate a beat note signal when the three-tone laser beam strikes the photodetector, and wherein the system further comprises a second RF generator configured to generate a second sinusoidal modulation signal at a frequency different than a frequency of the first sinusoidal modulation signal.

12. The system of claim 11, wherein the second sinusoidal modulation signal is mixed with the beat note signal.

13. The system of claim 11, wherein the second sinusoidal modulation signal has a frequency that is 100 kHz less than the frequency of the first sinusoidal modulation signal.

14. A system for measuring temperature and gas concentrations in a combustion environment, comprising:

a laser source configured to transmit a laser beam to target single or multiple transitions of gas species;

a laser driver connected to the laser source and configured to control a temperature and an injection current of the laser source;

an RF generator configured to generate a first sinusoidal modulation signal that modulates the laser beam transmitted from the laser source to produce a three-tone laser beam;

a ramp function generator configured to generate a ramp signal;

a bias-tee connected to the RF generator and configured to direct the first sinusoidal modulation signal and the ramp signal to the laser source;

a detector configured to detect a three-tone laser beam that has been transmitted through a combustion environment;

a non-transitory computer readable medium comprising stored instructions that when executed cause at least one processor to receive a signal from the detector and process the signal for recovery of dispersion spectra; and a concave mirror disposed in front of the detector and configured to mitigate a beam steering effect related to the three-tone laser beam.

15. A method for measuring temperature and gas concentrations in combustion environment, comprising:

generating, by an RF generator, a sinusoidal modulation signal configured to modulate a laser beam to produce a three-tone laser beam;

transmitting the sinusoidal modulation signal to a laser source;

transmitting, by the laser source, a three-tone laser beam through a combustion environment;

detecting, by a photodetector, the three-tone laser beam transmitted through the combustion environment;

measuring, by a computer-readable medium, a dispersion spectra of the three-tone laser beam transmitted through the combustion environment; and generating, by a second RF generator, a second sinusoidal modulation signal at a frequency different than a frequency of the first sinusoidal modulation signal, wherein the photodetector is configured to generate a beat note signal when the three-tone laser beam strikes the photodetector.

16. The method of claim 15, further comprising:

assisting, by a visible laser, an optical alignment of the three-tone laser beam.

17. A system for measuring temperature and gas concentrations in a combustion environment, comprising:

a plurality of laser sources, each configured to transmit a respective laser beam to target single or multiple transitions of gas species;

a plurality of laser controllers, each connected to a respective laser source and each configured to control a temperature and an injection current of the respective laser source;

a plurality of RF generators, each configured to generate a respective first sinusoidal modulation signal to modulate a laser beam to produce a respective three-tone laser beam;

a plurality of bias-tees, each connected to a respective RF generator and configured to direct a respective first modulated signal and a respective ramp signal to each respective laser source of the plurality of laser sources;

a plurality of photodetectors, each configured to detect a respective three-tone laser beam transmitted through a combustion environment; and a non-transitory computer readable medium comprising stored instructions that when executed cause at least one processor to receive a respective signal from each respective detector and process each respective signal for recovery of dispersion spectra, wherein each respective laser source is configured to simultaneously transmit a respective three-tone laser into the combustion environment.

* * * * *